(12) United States Patent
Lin et al.

(10) Patent No.: US 8,051,440 B2
(45) Date of Patent: Nov. 1, 2011

(54) OPTICAL READ/WRITE DEVICE

(75) Inventors: Hung-Ming Lin, Taipei Hsien (TW); Xi-Ping Dai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 902 days.

(21) Appl. No.: 12/047,328

(22) Filed: Mar. 13, 2008

(65) Prior Publication Data

US 2008/0229347 A1 Sep. 18, 2008

(30) Foreign Application Priority Data

Mar. 16, 2007 (CN) .......................... 2007 1 0200292

(51) Int. Cl.
*G11B 7/00* (2006.01)
(52) U.S. Cl. ........ 720/663; 720/664; 720/665; 720/676; 720/677
(58) Field of Classification Search .................. 720/659, 720/663–665, 676–677, 679
See application file for complete search history.

(56) References Cited

U.S. PATENT DOCUMENTS

| | | | | |
|---|---|---|---|---|
| 6,058,098 A * | 5/2000 | Kato | ............................. | 720/663 |
| 6,657,943 B2 * | 12/2003 | Muto et al. | .................... | 720/619 |
| 6,683,841 B2 * | 1/2004 | Lin | ................................ | 720/665 |
| 6,724,714 B1 * | 4/2004 | Kato et al. | ..................... | 720/672 |
| 6,922,841 B2 * | 7/2005 | Lee et al. | ....................... | 720/677 |
| 2003/0156528 A1 * | 8/2003 | Lee et al. | ....................... | 369/223 |
| 2003/0235139 A1 * | 12/2003 | Takeuchi | ....................... | 369/223 |
| 2004/0109403 A1 * | 6/2004 | Chen et al. | ..................... | 369/223 |
| 2004/0205795 A1 * | 10/2004 | Choi | ............................. | 720/679 |
| 2004/0255316 A1 * | 12/2004 | Ryu | .............................. | 720/672 |
| 2004/0268372 A1 | 12/2004 | Liu | | |
| 2005/0149960 A1 * | 7/2005 | Pu | ................................. | 720/664 |
| 2006/0161938 A1 * | 7/2006 | Bae et al. | ....................... | 720/663 |
| 2006/0212890 A1 * | 9/2006 | Miki et al. | .................... | 720/676 |

FOREIGN PATENT DOCUMENTS

| | | |
|---|---|---|
| CN | 1805024 A | 7/2006 |
| JP | 10188498 A | 7/1998 |

* cited by examiner

*Primary Examiner* — Daniell L Negron
*Assistant Examiner* — Carlos E Garcia
(74) *Attorney, Agent, or Firm* — Altis Law Group, Inc.

(57) ABSTRACT

According to one aspect, an optical read/write device for reading and/or writing an optical disc includes a base, optical pickup head, and a driving mechanism for slidably driving the optical pickup head. The driving mechanism includes a worm gear, a motor for rotating the worm gear, and a rack disposed between the worm gear and the optical pickup head for transferring motion from the worm gear to the optical pickup head. The rack includes a fastening portion for fixing the rack to the optical pickup head, a mesh portion for engaging with the worm gear, a restricting portion connected to the mesh portion for being blocked by the gear seat when the mesh portion is pressed by the worm gear to prevent the mesh portion from disengaging from the worm gear, and a connecting portion for connecting the fastening portion with the restricting portion.

13 Claims, 4 Drawing Sheets

OPTICAL READ/WRITE DEVICE

BACKGROUND

1. Field of the Invention

The present invention generally relates to optical read/write devices and, more particularly, to a mechanism for driving an optical pickup head of an optical read/write device.

2. Description of Related Art

In general, an optical pickup head records or reproduces information while moving across a recording data storage medium such as a disc. The optical pickup head includes a light source, for emitting laser light, and an objective lens for focusing the laser light to form an optical spot on the disc. As such, the optical pickup head is able to write or read information to or from the optical disc. The optical pickup head is driven by an optical pickup head driving mechanism, so that the optical pickup head moves along a path corresponding to a radial direction of the optical disc.

A conventional optical pickup head driving mechanism includes a motor, a worm gear connected to a rotor of the motor, and a gear portion attached to the optical pickup head. The gear portion engages with the worm gear. The motor drives the worm gear to rotate and the gear portion is moved linearly by the worm gear. Thus the optical pickup head is moved linearly along a radial direction of the optical disc correspondingly.

However, the optical pickup head cannot be moved precisely because stress between the worm gear and the gear portion may cause the gear portion to disengage with the worm gear.

Therefore, a need exists for an optical read/write device resolving the above problem in the industry.

SUMMARY

According to one aspect, an optical read/write device for reading and/or writing an optical disc includes a base, optical pickup head, and a driving mechanism for slidably driving the optical pickup head. The driving mechanism includes a worm gear, a motor for rotating the worm gear, and a rack disposed between the worm gear and the optical pickup head for transferring motion from the worm gear to the optical pickup head. The rack includes a fastening portion for fixing the rack to the optical pickup head, a mesh portion for engaging with the worm gear, a restricting portion connected to the mesh portion for being restrained by the gear seat when the mesh portion is pressed by the worm gear to prevent the mesh portion from disengaging from the worm gear, and a connecting portion for connecting the fastening portion with the restricting portion.

Other systems, methods, features, and advantages of the present optical read/write device will be or become apparent to one with skill in the art upon examination of the following drawings and detailed description. It is intended that all such additional systems, methods, features, and advantages be included within this description, be within the scope of the present device, and be protected by the accompanying claims.

BRIEF DESCRIPTION OF THE DRAWINGS

Many aspects of the present optical read/write device can be better understood with reference to the following drawings. The components in the drawings are not necessarily drawn to scale, emphasis instead being placed upon clearly illustrating the principles of the present device. Moreover, in the drawings, like reference numerals designate corresponding parts throughout the several views.

DETAILED DESCRIPTION OF THE EMBODIMENTS

Reference will now be made to the drawings to describe preferred embodiments of a present optical read/write device, in detail.

Figure 1:
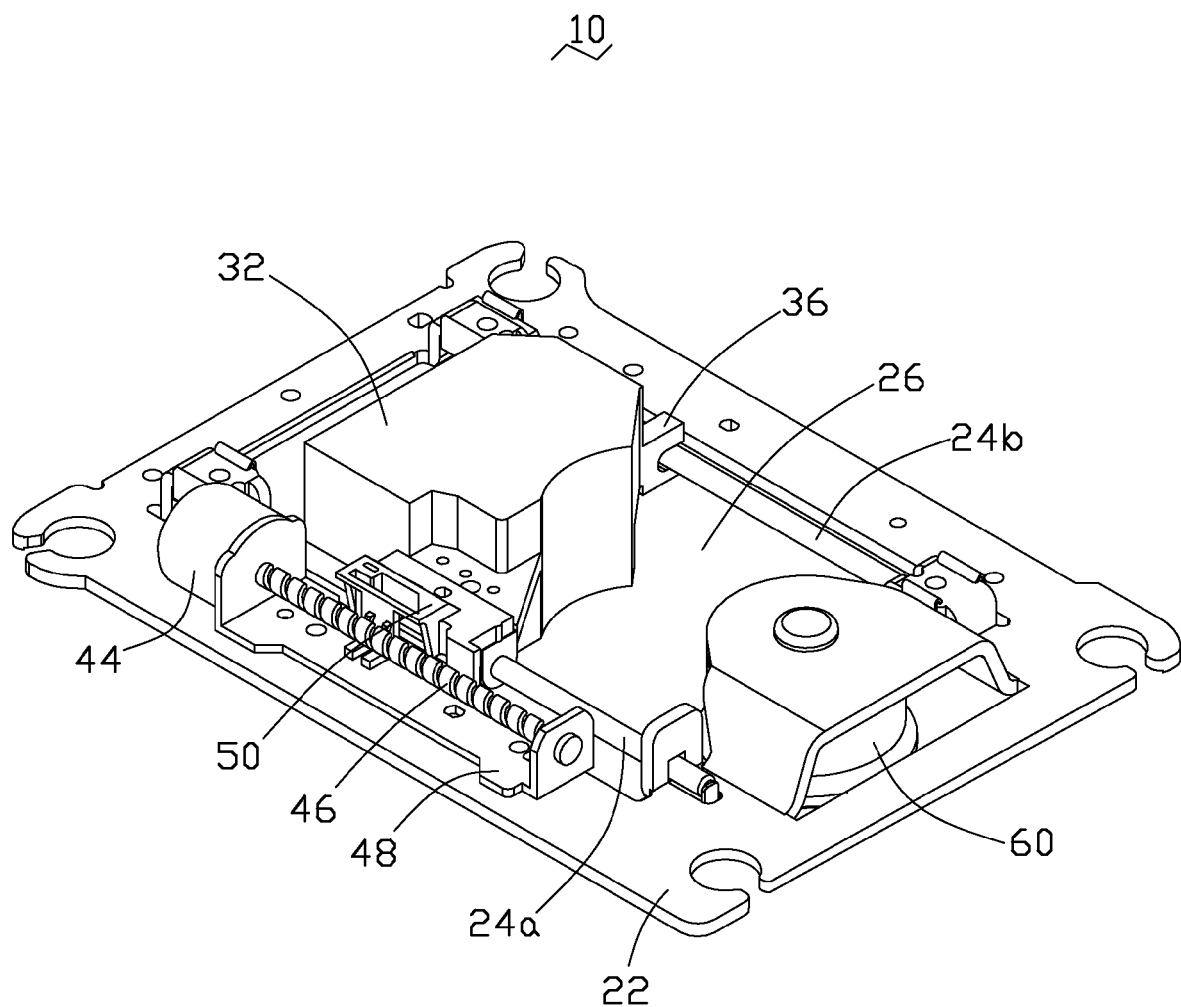
FIG. 1 is an isometric view of an optical read/write device in accordance with an exemplary embodiment.
Figure 2:
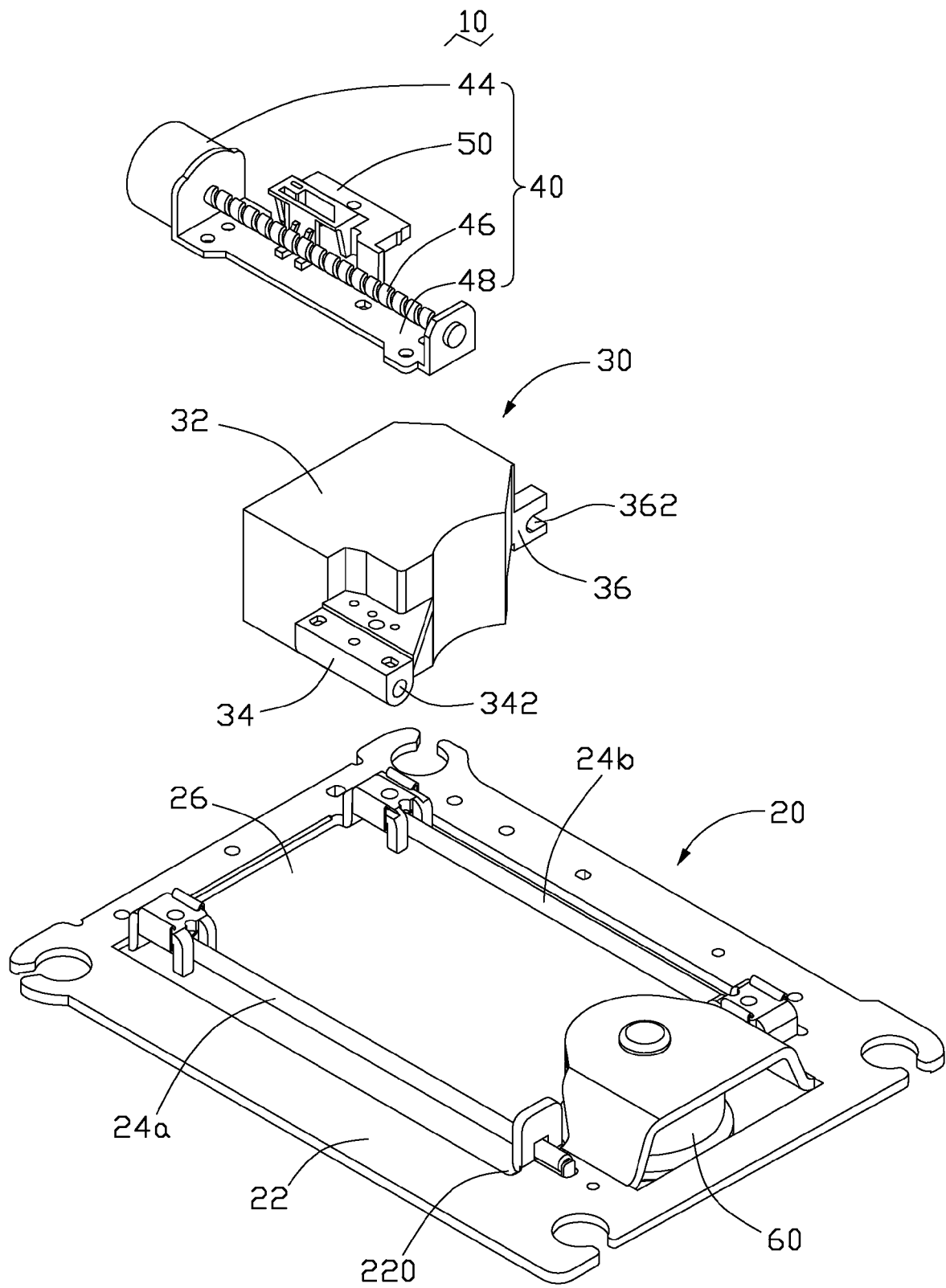
FIG. 2 is an exploded, isometric view of the optical read/write device of FIG. 1.

Referring to FIGS. 1 and 2, an optical read/write device 10 in accordance with an exemplary embodiment is illustrated. The optical read/write device 10 includes a base 20, an optical pickup head 30 slidably assembled on the base 20, a driving mechanism 40, and a spindle motor 60 mounted on the base 20.

The base 20 includes a chassis 22, a first guide member 24a, and a second guide member 24b. The chassis 22 defines a substantially rectangular opening 26 in a center of the chassis 22. The spindle motor 60 is mounted adjacent a shorter side of the chassis 22 and configured for rotating an optical disc (not shown). The guide members 24a, 24b are correspondingly disposed on opposite longer sides of the chassis 22.

The optical pickup head 30 includes a main body 32 for housing optical lenses (not shown) etc. The optical pickup head 30 further includes a first projection portion 34 and a second projection portion 36 correspondingly formed on opposite sides of the main body 32. The first projection portion 34 defines a guide hole 342 for slidably receiving the first guide member 24a. The second projection portion 36 defines a guide notch 362 for slidably receiving the second guide member 24b accordingly. The guide hole 342, the first guide member 24a, the guide notch 362, and the second guide member 24b allow the optical pickup head 30 to be slidably assembled on the base 20.

Figure 3:
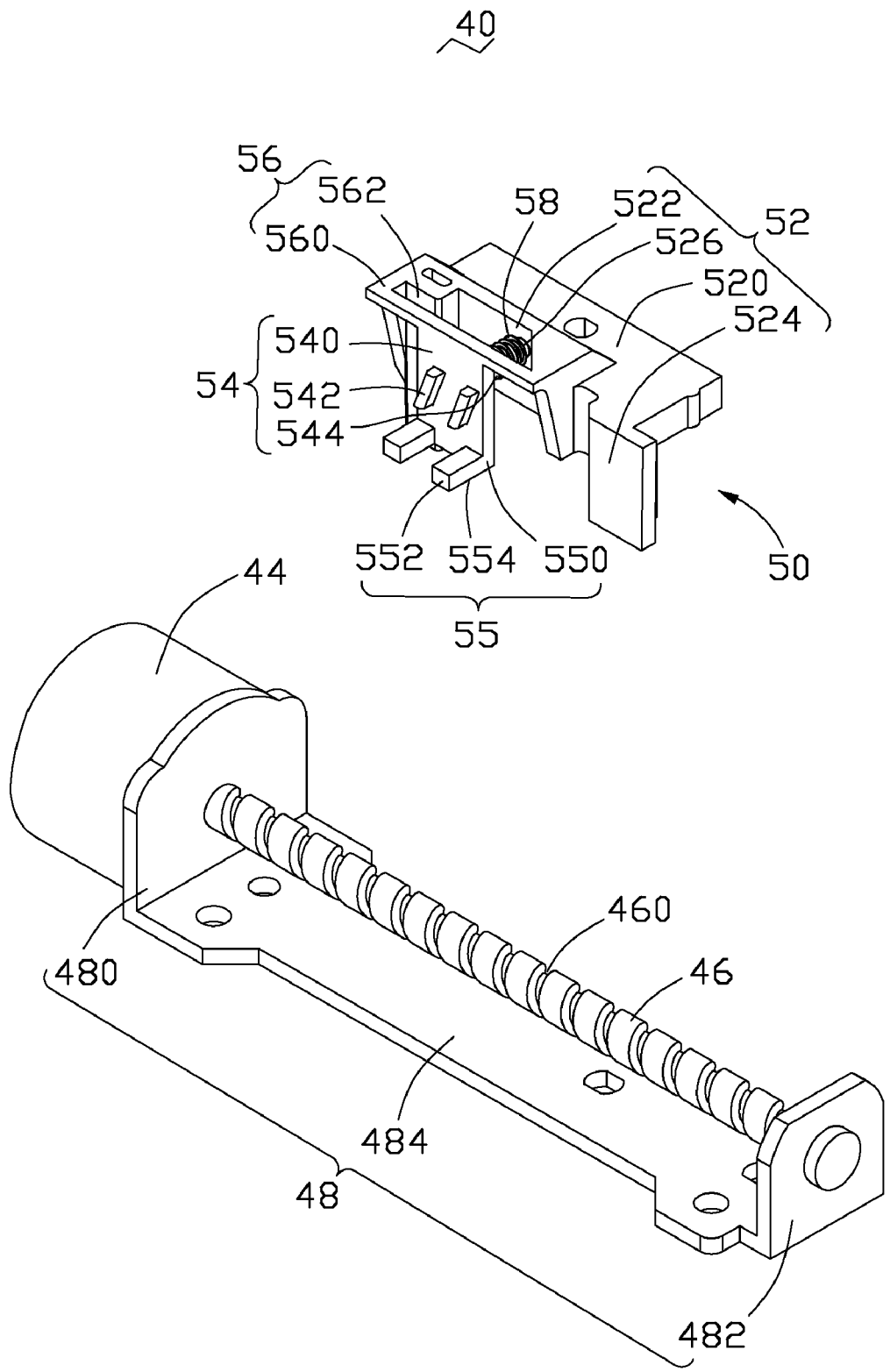
FIG. 3 is an enlarged, isometric view of a rack and a worm gear in FIG. 1.

Referring also to FIG. 3, the driving mechanism 40 includes a feed motor 44, a worm gear 46, a gear seat 48, and a rack 50.

The feed motor 44 is mounted on the chassis 22 at a same side of the first guide member 24a. The worm gear 46 is parallel to the first guide member 24a. An end of the worm gear 46 connects to a rotor (not shown) of the feed motor 44, and another end of the worm gear 46 is supported on the gear seat 48. The surface of the worm gear 46 defines a thread 460.

The rack 50 is connected to the optical pickup head 30 and engaged with the worm gear 46 for driving the optical pickup head 30 to move when the feed motor 44 rotates accordingly. The rack 50 includes a fastening portion 52, a mesh portion 54 opposite to the fastening portion 52, a connecting portion 56 for connecting the fastening portion 52 to the mesh portion 54, and a restricting portion 55.

The fastening portion 52 includes a mounting plate 520, a base plate 522, and a block member 524. The mounting plate 520 is configured for fixing the rack 50 to the optical pickup head 30. The base plate 522 and the block member 524 perpendicularly extend from the mounting plate 520. A first cylindrical protrusion 526 is formed on the base plate 522 and protrudes toward the mesh portion 54. The block member 524 protrudes from the mounting plate 520 along an axis of the worm gear 46. When the optical pickup head 30 is reading/writing information near a center portion of the optical disc, the block member 524 abuts an inner edge 220 adjacent to the spindle motor 60 of the chassis 22. In other words, the block member 524 prevents the main body 32 of the optical pickup head 30 from colliding with the spindle motor 60, thus preventing damages to the optical pickup head 30.

The mesh portion 54 includes an engaging plate 540, a pair of engaging teeth 542, and a second cylindrical protrusion 544. The engaging teeth 542 and the second cylindrical protrusion 544 are correspondingly disposed at opposite sides of the engaging plate 540. The engaging teeth 542 meshes with the thread 460 of the worm gear 46 for converting rotational motion of the worm gear to linear motion so as to drive the optical pickup head 30 accordingly. The second cylindrical protrusion 544 extends toward the first cylindrical protrusion 526. The second cylindrical protrusion 544 and the first cylindrical protrusion 526 collectively define a gap between them. Ends of the spring 58 are sleeved on the first cylindrical protrusion 526 and the second cylindrical protrusion 544 correspondingly.

The restricting portion 55 extends from the mesh portion 54 and configured for preventing the mesh portion 54 from detaching out of the worm gear 46. The restricting portion 55 is perpendicular to the mesh portion 54. A connecting end 550, of the restricting portion 55, is connected to the engaging plate 540. A free end 552 of the restricting portion 55 is opposite to the connecting end 550. The restricting portion 55 further includes a lower surface 554 facing the gear seat 48. In this embodiment, the rack 50 includes two restricting portions 55.

The connecting portion 56 includes a connecting arm 560 connecting the fastening portion 52 and the mesh portion 54. A space 562 is defined in the rack 50 between the base plate 522 and the engaging plate 540 for mold releasing when manufacturing the rack 50.

The gear seat 48 includes a first supporting portion 480, a second supporting portion 482 opposite to the first supporting portion 480, and a base board 484. The first supporting portion 480 is configured for supporting the feed motor 44. The second supporting portion 482 supports another end of the worm gear 46. The base board 484 is parallel to the worm gear 46 with a gap located between the worm gear 46 and the base board 484.

A detailed assembly procedure of the optical read/write device 10 will now be described. First, the spindle motor 60 is secured to the chassis 22. The guide members 24a, 24b are respectively passed through the guide hole 342 and the guide notch 362 of the optical pickup head 30. Then the guide members 24a, 24b are respectively mounted on two longer sides of the chassis 22. Thus, the optical pickup head 30 has been slidably assembled on the base 20. The feed motor 44 and the gear seat 48 are mounted on the chassis 22 with the worm gear 46 being parallel and adjacent to the first guide member 24a. The rack 50 is then connected to the optical pickup head 30. That is, the restricting portion 55 is inserted into the gap between the worm gear 46 and the gear seat 48. The mounting plate 520 is fixed to the main body 32 of the optical pickup head 30. Thus the engaging teeth 542 are meshed with the thread 460 of the worm gear 46 because the spring 58 pushes the engaging plate 540.

When the optical read/write device 10 reads/writes data from/onto the optical disc, the feed motor 44 drives the worm gear 46 to rotate. The rack 50 moves linearly because the engaging teeth 542 of the rack 50 are meshed with the thread 460 of the worm gear 46. The optical pickup head 30 is moved linearly because the rack 50 is fixed to the optical pickup head 30.

Figure 4:
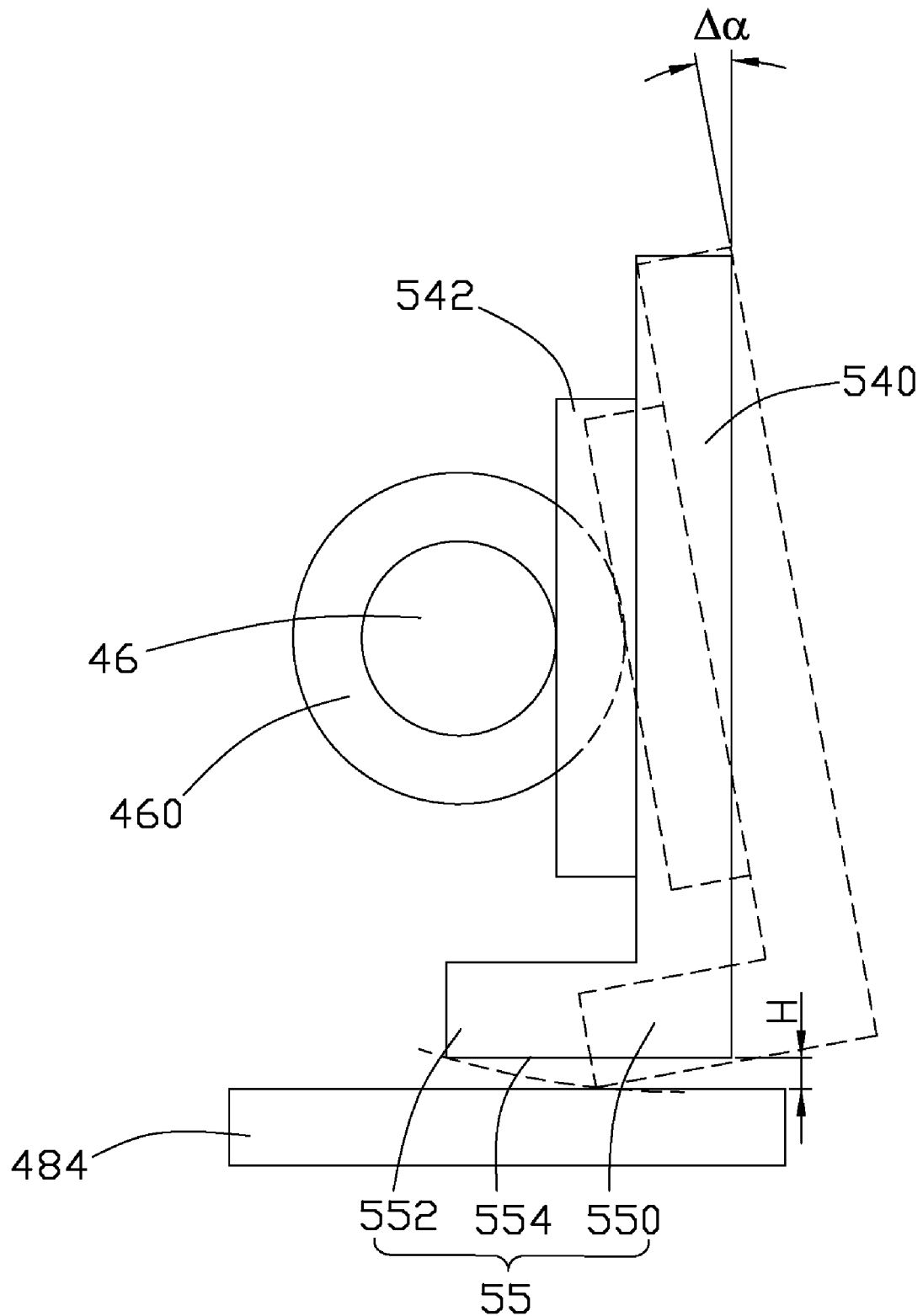
FIG. 4 is a schematic diagram showing a process of preventing the rack from disengaging with the worm gear.

Referring to FIG. 4, if the pressure between the worm gear 46 and the engaging teeth 542 becomes too high that the engaging teeth 542 is about to detach from the thread 460, the mesh portion 54 rotates about a connection part between the mesh portion 54 and the connecting portion 56. The restricting portion 55 follows the rotation of the mesh portion 54 correspondingly. After rotating an angle $\Delta\alpha$, the free end 552 will be blocked by the base board 484, thus preventing the engaging teeth 542 from separating from the thread 460.

In other alternative embodiments, the number of engaging teeth 542 can be changed other than two, such as one or three, etc. The spring 58 may be replaced with other resilient members, such as a resilient metal plate. The base board 484 can be omitted, and the free end 552 will be restrained by the chassis 22 accordingly. In these exemplary embodiments, a distance H between the lower surface 554 of the restricting portion 55 and the base board 484 or the chassis 22 can be adjusted. That is, the distance H should be less than a maximum value such that the free end 552 barely contacts the base board 484 or the chassis 22.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An optical read/write device for reading/writing an optical disc, the optical read/write device comprising:
    a base;
    an optical pickup head slidably assembled on the base; and
    a driving mechanism for slidably driving the optical pickup head, the driving mechanism comprising:
        a worm gear;
        a motor connected to the worm gear for rotating the worm gear; and
        a rack disposed between the worm gear and the optical pickup head for transferring motion from the worm gear to the optical pickup head, the rack comprising:
            a fastening portion for fixing the rack to the optical pickup head;
            a mesh portion for engaging with the worm gear;
            a restricting portion, connected to the mesh portion, for being restrained by the base when the mesh portion is pressed by the worm gear to prevent the mesh portion from disengaging from the worm gear; and
            a connecting portion for connecting the fastening portion and the restricting portion.

2. The optical read/write device as claimed in claim 1, wherein the mesh portion rotates about a connection part between the mesh portion and the connecting portion when the mesh portion is pressed by the worm gear.

3. The optical read/write device as claimed in claim 1, wherein the restricting portion perpendicularly extends from the mesh portion.

4. The optical read/write device as claimed in claim 1, wherein the restricting portion comprises a connecting end connected to the mesh portion and a free end opposite to the connecting end.

5. The optical read/write device as claimed in claim 4, wherein the free end is restrained by the base when the mesh portion is pressed by the worm gear.

6. The optical read/write device as claimed in claim 1, wherein the fastening portion comprises a block member protruding along an axis of the worm gear for protecting the optical pickup head.

7. An optical read/write device for reading and/or writing an optical disc, the optical read/write device comprising:
   a base;
   an optical pickup head slidably assembled on the base; and
   a driving mechanism for slidably driving the optical pickup head, the driving mechanism comprising:
   a worm gear;
   a motor connected to the worm gear for rotating the worm gear;
   a gear seat for supporting the worm gear and the motor; and
   a rack disposed between the worm gear and the optical pickup head for transferring motion from the worm gear to the optical pickup head, the rack comprising:
   a fastening portion for fixing the rack to the optical pickup head;
   a mesh portion for engaging with the worm gear;
   a restricting portion connected to the mesh portion for being restrained by the gear seat when the mesh portion is pressed by the worm gear to prevent the mesh portion from disengaging from the worm gear; and
   a connecting portion for connecting the fastening portion and the restricting portion.

8. The optical read/write device as claimed in claim 7, wherein the mesh portion rotates about a connection part between the mesh portion and the connecting portion when the mesh portion is pressed by the worm gear.

9. The optical read/write device as claimed in claim 7, wherein the restricting portion perpendicularly extends from the mesh portion.

10. The optical read/write device as claimed in claim 7, wherein the restricting portion comprises a connecting end connected to the mesh portion and a free end opposite to the connecting end.

11. The optical read/write device as claimed in claim 10, wherein the gear seat comprises two supporting portions for supporting the worm gear and a base board for blocking the restricting portion.

12. The optical read/write device as claimed in claim 11, wherein the free end is restrained by the base board when the mesh portion is pressed by the worm gear.

13. The optical read/write device as claimed in claim 7, wherein the fastening portion comprises a block member protruding along an axis of the worm gear for protecting the optical pickup head.

* * * * *